United States Patent [19]

Tonge

[11] Patent Number: 4,764,554

[45] Date of Patent: Aug. 16, 1988

[54] THICKENERS FOR EMULSION PAINTS

[75] Inventor: Christopher J. Tonge, Darwen, England

[73] Assignee: Crown Decorative Products Limited, Darwen, England

[21] Appl. No.: 55,839

[22] Filed: Jun. 1, 1987

[30] Foreign Application Priority Data

Jun. 3, 1986 [GB] United Kingdom ............... 8613408

[51] Int. Cl.$^4$ .................. C08F 120/26; C08F 20/26; C08L 31/06; C08L 33/02
[52] U.S. Cl. ................... 524/558; 524/501; 524/559; 524/561; 524/823; 524/833; 526/317.1; 526/318; 526/318.2; 526/318.25; 526/318.3; 526/318.4
[58] Field of Search ............... 526/318, 318.2, 318.3, 526/318.4, 320, 318.25, 317.1; 524/823, 833, 558-562, 501

[56] References Cited

U.S. PATENT DOCUMENTS

| | | | |
|---|---|---|---|
| 3,891,591 | 6/1975 | Chang et al. | 524/238 |
| 4,138,381 | 2/1979 | Chang et al. | 526/318.2 |
| 4,230,844 | 10/1980 | Chang et al. | 524/765 |
| 4,322,327 | 3/1982 | Yoshimura et al. | 524/839 |
| 4,421,902 | 12/1983 | Chang et al. | 526/318.3 |
| 4,429,097 | 1/1984 | Chang et al. | 526/318.3 |
| 4,451,608 | 5/1984 | Drake et al. | 526/320 |

FOREIGN PATENT DOCUMENTS 2127836 4/1984 United Kingdom .

Primary Examiner—Herbert J. Lilling
Attorney, Agent, or Firm—William R. Hinds

[57] ABSTRACT

The thickener comprises:
(a) 25–45% of methacrylic acid, acrylic acid or a mixture thereof;
(b) 25–65% of alkyl acrylate such as methyl acrylate, ethyl acrylate, butyl acrylate, alkyl methacrylate such as methyl methacrylate, ethyl methacrylate, butyl methacrylate, lauryl methacrylate or a mixture thereof;
(c) 1–40% of an ester of composition;

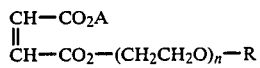

in which R is a $C_{12}$–$C_{25}$ alkyl group, n=at least 10; m=at least 5 A=H, —$(CH_2CH_2O)_n$—R, $C_1$–$C_{20}$ alkyl,—$(CH_2CH_2O)_m$-H or —$(CH_2CH_2O)_m$—$CH_3$ (d) 0–1% of a polyethylenically unsaturated monomer effective for chain branching or crosslinking such as diallyl maleate, diallyl phthalate, divinyl benzene, allyl methacrylate, ethylene glycol dimethacrylate, or trimethylol propane triacrylate,
(e) optionally, but preferably, up to 10% of an ethylenically unsaturated hydrophylic monomer.

8 Claims, No Drawings

THICKENERS FOR EMULSION PAINTS

BACKGROUND

So-called "associative thickeners" have been exploited commercially in a wide range of coatings recently. Such thickeners show many advantages in emulsion paints over traditional thickeners, such as cellulosics and non-associative alkali-soluble acrylics, including better flow and levelling, improved application characteristics especially with rollers and good water resistance. A common feature of these associative thickeners is that they comprise molecules that contain both hydrophilic and hydrophobic sections. The hydrophilic parts maintain the solubility of the molecule in the aqueous phase whilst the hydrophobic parts have a tendency to associate with the hydrophobic parts of dissolved or dispersed materials.

One of the most economical types of prior art associative thickener is based on a copolymer of various (meth) acrylates and (meth) acrylic acid which has been modified to give branches from the main polymer chain consisting of a hydrophilic polyethylene oxide chain tipped by a moderately large hydrophobic group. Such associative branches are commonly introduced by the use of a monomer comprising an ester of a polymerisable mono- or di-carboxylic acid and a hydroxy terminated non-ionic surfactant. This class of monomer can be described by the formula:

$$R_1[CO_2\text{-}(CH_2CH_2O)_n\text{-}R_2]_m$$

Where $R_1$ is an ethenyl or ethenylene group such as
   $CH_2=CH-$
   $CH_2=C(CH_3)-$
   $-CH=CH-$
   $-CH=C(CH_3)-$
   n is an integer between 10 and 100
   m=1 for when $R_1$ is ethenyl and m=2 when $R_1$ is ethenylene
   $R_2$ is the hydrophobic part of the molecule which is commonly a $C_{12}$ to $C_{25}$ alkyl group, an alkyl ($C_8$-$C_9$) phenyl or a polyalkylene ($C_3$ or $C_4$) oxide chain.

The patent literature shows that several combinations of these components have already been recognised as having the potential for use in thickeners:
EP No. 0 011 806 (Dow) suggests:
   $R_1$ is $CH_2=CH-$ or $CH_2=C(CH_3)-$
   n=6-100; m=1
   $R_2$ is alkyl phenol or propoxylated alkyl phenol
EP No. 0 013 836 (Rohm and Haas) recommends:
   $R_1$ is $CH_2=CH-$ or $CH_2=C(CH_3)-$
   n=8-60; m=1
   $R_2$ is $C_{12}$-$C_{18}$ alkyl
GB No. 2 127 836 (Uniroyal) defines useful materials where:
   $R_1$ is $-CH=CH-$ or $-CH=C(CH_3)-$
   n=10-70; m=2
   $R_2$ is alkyl phenol
JA No. 83 180 510 (Toyo Soda); Chem Abs. 1984 100 104062 suggests:
   $R_1$ is $$CH_2=C-CO_2CH_3$$
$$|$$
$$CH_2-$$

n=(unspecified); m=1
   $R_2$ is $C_{18}$ alkyl

SUMMARY OF INVENTION

The present invention provides an improved thickener comprising a polymer prepared from the following components:
(a) 25-45% methacrylic acid, acrylic acid or a mixture thereof;
(b) 25-65% alkyl acrylate, alkyl methacrylate or mixture thereof;
(c) 1-40% of an ester of composition $$\begin{array}{l} CH-CO_2A \\ \| \\ CH-CO_2-(CH_2CH_2-O)_n-R \end{array}$$

in which R is a $C_{12}$-$C_{25}$ alkyl
n=at least 10; m=at least 5
A=H, $-(CH_2CH_2-O)_n-R$, $C_1$-$C_{20}$ alkyl, $-(CH_2CH_2-O)_m-H$ or $-(CH_2CH_2-O)_m-CH_3$
(d) 0-1.0% of a polyethylenically unsaturated monomer which is effective for chain branching or crosslinking
(e) Not more than 10% of an ethylenically unsaturated hydrophylic monomer as an optional, but preferred, component,
the total of components (a), (b), (c), (d) and (e) being in substance 100%.

Suitable monomers of component (b) are methyl acrylate, ethyl acrylate, butyl acrylate, methyl methacrylate, ethyl methacrylate, butyl methacrylate and lauryl methacrylate.

Examples of monomers of component (d) are diallyl maleate, diallyl phthalate, divinyl benzene, allyl methacrylate, ethylene glycol dimethacrylate and trimethylol propane triacrylate.

The monomers of component (e) may have the general formula:

$$CH_2=\underset{\underset{}{R}}{C}-CO-\left[CH_2-\underset{\underset{}{CH_3}}{CH}-O\right]_m-(CH_2-CH_2-O)_n-H$$
           $\|$
           $O$ where R is H or $-CH_3$;
   m is an integer between 0 and 10;
   n is an integer between 5 and 20.

Useful examples of component (e) are:

$$CH_2=\underset{\underset{CH_3}{|}}{C}-\underset{\underset{}{\|}}{C}O-\left[CH_2-\underset{\underset{}{CH_3}}{CH}-O\right]_4-(CH_2-CH_2-O)_7-H$$
           $O$ $$CH_2=\underset{\underset{CH_3}{|}}{C}-\underset{\underset{}{\|}}{C}O-(CH_2-CH_2-O)_{16}-H$$
              $O$ Compositions according to the invention, when used as a thickener for emulsion paints, provide the properties expected from an associative thickener, namely, rheological control during application including good flow, levelling and freedom from roller spatter and good in-can structure. In addition they show an unexpected and remarkable improvement in paint stability and compatibility with the pigments or stainers used to colour the paint.

EXAMPLE

Preparation of the associative monomer (Component (c))

93.35 parts of an ethoxylated cetyl/oleyl alcohol containing 19 ethylene oxide units was heated with 6.65 parts of maleic anhydride at 150° C. for 1 hour. The material was cooled and used without further treatment.

Similar monomers were made using a variety of ethoxylated alcohols. Where the water content of these surfactants exceeded 0.5% they were dried by refluxing with toluene under a Dean and Stark water separator. Most of the toluene was removed under vacuum. The examples are summarised in Table 1.

Preparation of the polymeric thickener

The following formulation was used:

| A | Water | 520 |
|---|---|---|
|   | Surfactant (30%)* | 29.7 |
| B | Ethyl acrylate | 342 |
|   | Methacrylic acid | 207 |
|   | Associative Monomer** | 38.5 |
|   | Diallyl phthalate | 0.7 |
| C | Water | 680 |
|   | Surfactant (30%)* | 29.7 |
| D | Ammonium persulphate | 0.6 |
|   | Water | 72 |
| E | Ammonium persulphate | 0.2 |
|   | Water | 75 |

*The surfactant used is an anionic sulphosuccinate type.
**Component (c) as prepared above.

A is charged to a 2 liter flask fitted with a thermometer, a reflux condenser and inlets for various materials, and purged with nitrogen whilst heating to 80°-85° C. The monomers B are mixed together and stirred into C to form a pre-emulsion. 65 g of the pre-emulsion is added to A at 80° C. and followed by 50 g of D. After completion of the initial reaction (10 minutes) the remainder of the pre-emulsion and D are fed into the flask steadily over a period of 1 hour. The temperature is maintained at 80°-85° C. On completion of the feed the emulsion is held at 85° C. for 15 minutes. E is added followed by a further hold period of 15 minutes. The emulsion is then cooled, discharged and filtered.

Typical properties are:

| Non-volatile content | 30.3% |
|---|---|
| pH | 3.6 |
| Particle size | <100 nm |
| Grit retained on 53 micron sieve | negligible |
| Appearance | low viscosity milky liquid |

Neutralised solution viscosity

The pH of a 1% non-volatile dilution in water is raised to 9.0-9.5 with aqueous ammonia solution. The viscosity is measured using a Haake VT 24 viscometer with an MVI rotor at 25° C. Viscosity measurements on the example above were as follows:

525 cp at 13.25 s$^{-1}$
388 cp at 26.5 s$^{-1}$
287 cp at 53.0 s$^{-1}$
216 cp at 106 s$^{-1}$
165 cp at 212 s$^{-1}$
126 cp at 424 s$^{-1}$

PREPARATION OF EMULSION PAINT

An emulsion paint was prepared using conventional manufacturing techniques:

| Ingredients | Amounts (parts by weight) |
|---|---|
| Mains water | 2160.0 |
| 1,2-Benzisothiazolin-3-one 33% aqueous suspension | 6.0 |
| Thickener of the above example @10% non-volatile | 100.0 |
| Ammonium hydroxide solution, 0.89 S.G. | 52 |
| "TEXANOL" (R.T.M.) ester-alcohol | 100.5 |
| Sodium salt of a polymeric carboxylic acid "OROTAN" (R.T.M.) 731 | 67.5 |
| Foam control agent "BEVALOID" (R.T.M.) 677 | 30.0 |

To the mixture of the above ingredients was then added:

| China clay (Grade B. E.C.C. International) | 300.0 |
|---|---|
| Calcium carbonate "SNOWCAL" (R.T.M.) 6 ML | 495.0 |
| Talc "MISTRON" (R.T.M.) 754 | 300.0 |
| Titanium dioxide pigment "TIOXIDE" (R.T.M.) R-XL | 2250.0 |

The mixture was then dispersed for 15 minutes with a high speed mixer. To the mixture was then added:

| Mains water | 510.0 |
|---|---|
| Vinyl acetate/"VEOVA" (R.T.M.) 10 Copolymer emulsion 55% non-volatile "EMULTEX" (R.T.M.) VV 536 | 1830.0 |
| Thickener of the above example @ 10% non-volatile | 300.0 |
| Mains water | 617.0 |
| Phthalocyanine Blue paste dispersion | 40.0 |

The whole was then mixed for a further 15 minutes at a slower speed to ensure maximum viscosity development of the thickener and thorough incorporation of the phthalocyanine blue paste dispersion.

After 16 hours the paint had developed a round, creamy consistency with good application and flow properties and no colour shedding.

Similar paints were prepared using two prior art associative thickeners previously referred to.

After 16 hours the paint based on the first thickener had developed a creamy consistency with good application and flow properties but a distinct layer of darker blue material had shed on to the surface of the paint. This not only has an unpleasant appearance but tends to invite the user to stir or mix the paint with a resultant damage to the structure of the paint. The paint containing the second thickener showed no colour shedding but its consistency was appreciably stiffer and its application and flow properties were poor.

Both paints using the prior art thickeners were assessed as unsuitable for commercial production or use.

A variety of ethoxylated alcohols was used to prepare other monomers which were converted into thickeners and subsequently emulsion paints as described above. The results summarised in Table 1 below indicate some of the useful compositions that can be prepared according to the present invention. These can be used to tailor the thickener to suit specific application requirements.

TABLE 1

| Example | Hydrophobe | No. of moles of ethylene oxide | Thickener Solution Viscosity (1% NV pH 9.0–9.5) | | Relative Paint Thickening Efficiency (i) | Colour Separation (ii) | Colour Development (iii) |
|---|---|---|---|---|---|---|---|
| | | | 13 s$^{-1}$ | 10000 s$^{-1}$ | | | |
| a | cetyl-oleyl | 19 | 808 | 42 | 1 (standard) | None | Good |
| b | cetyl-oleyl | 20 | 791 | 39 | 0.93 | None | Good |
| c | cetyl-stearyl | 20 | 743 | 48 | 1 | None | Good |
| d | cetyl-stearyl | 20 | 888 | 48 | 1 | None | Good |
| e | lauryl | 23 | 420 | 40 | 0.76 | None | Good |
| f | nonyl phenol(*) | 20 | 371 | 39 | 0.76 | None | Good |
| g | cetyl-stearyl | 11 | 1373 | 42 | 1 | None | Good |
| d | cetyl-stearyl | 20 | 791 | 39 | 1 | None | Good |
| h | cetyl-stearyl | 50 | 759 | 45 | 0.87 | None | Fair |
| i | lauryl | 9 | 291 | 34 | 0.81 | None | Good |
| e | lauryl | 23 | 420 | 40 | 0.76 | None | Good |

Notes
(*)This example is not part of the present invention and is included for comparison only.
(i) The proportion of thickener needed to give the required paint viscosity relative to the amount of thickener (a).
(ii) The development of a distinct layer of darker blue material on the surface of the paint.
(iii) "Good" indicates that the strength of the blue colour of the paint did not develop further when the paint was subjected to high-shear mixing. "Fair" indicates a slight colour change.

A further example of the preparation of polymeric thickener is:

Formulation

| A | Water | 520 |
|---|---|---|
| | Surfactant (30%)* | 29.7 |
| B | Ethyl acrylate | 330 |
| | Methacrylic acid | 207 |
| | Associative Monomer** | 38.5 |
| | Hydrophylic monomer*** | 12.0 |
| | Diallyl phthalate | 0.7 |
| C | Water | 680 |
| | Surfactant (30%)* | 29.7 |
| D | Ammonium persulphate | 0.6 |
| | Water | 72 |
| E | Ammonium persulphate | 0.2 |
| | Water | 75 |

*The surfactant used is an anionic sulphosuccinate type
**Component (c) as prepared above
***Component (e) had the structure:

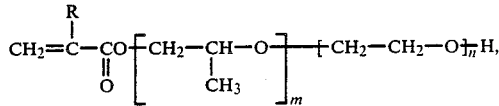

This thickener was prepared by the procedure described in the first thickener example.

A paint was prepared according to the paint formulation given above using the thickener containing the hydrophylic monomer (e). After 16 hours this paint had developed a creamy consistency with good application and flow properties and no colour shedding. On storage, especially at elevated temperatures, this paint developed a pleasing pasty gel structure whilst retaining its original good application and flow properties. The paint based on the thickener not containing component (e) showed a more slimey gel structure after a similar period of storage and was not considered to be such a desirable product.

What is claimed is:

1. A thickener comprising a polymer prepared from the following components:
   (a) 25–45% of methacrylic acid, acrylic acid or a mixture thereof;
   (b) 25–65% of alkyl acrylate, alkyl methacrylate, or a mixture thereof;
   (c) 1–40% of an ester of composition;

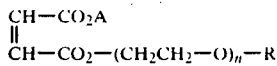

in which R is a $C_{12}$–$C_{25}$ alkyl group,
n = at least 10; m = at least 5
A = H, —(CH$_2$CH$_2$O)$_n$—R, $C_1$–$C_{20}$ alkyl, —(CH$_2$CH$_2$O)m—H or —(CH$_2$CH$_2$O)$_m$—CH$_3$
   (d) 0–1% of a polyethylenically unsaturated monomer effective for chain branching or crosslinking,
the total of components (a), (b), (c) and (d) being in substance 100%.

2. A thickener according to claim 1 but containing not more than 10% of an ethylenically unsaturated hydrophylic monomer (e) of the general formula

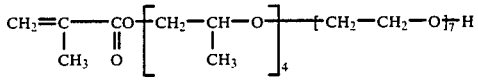

in which R is H or —CH$_3$,
m is an integer between 0 and 10,
n is an integer between 5 and 20,
the total of components (a), (b), (c), (d) and (e) being in substance 100%.

3. A thickener according to claim 1 in which (a) is 30–40%, (b) is 40–60%, (c) is 3–12%, (d) is 0.05–0.5% and the total of (a), (b), (c) and (d) is 100%.

4. A thickener according to claim 2 in which (a) is 30–40%, (b) is 30–60%, (c) is 3–12%, (d) is 0.05–0.5%, (e) is 0.5 to 10% and the total of (a), (b), (c), (d) and (e) is 100%.

5. A thickener according to claim 2 in which the formula of (c) is determined by:
A = H, n = 15–25 and R is a $C_{16}$–$C_{20}$ alkyl.

6. A method of thickening an emulsion paint utilising the composition of claim 2.

7. A thickener according to claim 1 wherein said polyethylenically unsaturated monomer effective for chain branching or cross linking is diallyl maleate, diallyl phthalate, divinyl benzene, allyl methacrylate, ethylene glycol dimethacrylate, or trimethylol propane triacrylate.

8. A thickener comprising a polymer prepared from the following components:

(a) 25–45% of methacrylic acid, acrylic acid or a mixture thereof;

(b) 25–65% of alkyl acrylate, alkyl methacrylate, or a mixture thereof;

(c) 1–40% of an ester of composition;

CH—$CO_2A$
CH—$CO_2$—$(CH_2CH_2O)_n$—R in which R is a $C_{12}$–$C_{25}$ alkyl group, n=at least 10; m=at least 5

A=H, —$(CH_2CH_2O)_n$—R, $C_1$-$C_{20}$ alkyl, —$(CH_2CH_2O)m$—H or —$(CH_2CH_2O)_m$—$CH_3$ (d) 0–1% of a polyethylenically unsaturated monomer effective for chain branching or crosslinking, (e) 0.5 to 10% of an ethylenically unsaturated hydrophylic monomer (e) of the general formula

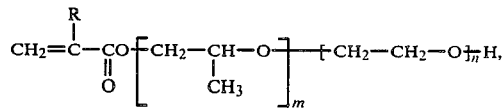

in which R is H or —$CH_3$, m is an integer between 0 and 10, n is an integer between 5 and 20, the total components (a), (b), (c), (d), and (e) being in substance 100%.

* * * * *